UNITED STATES PATENT OFFICE.

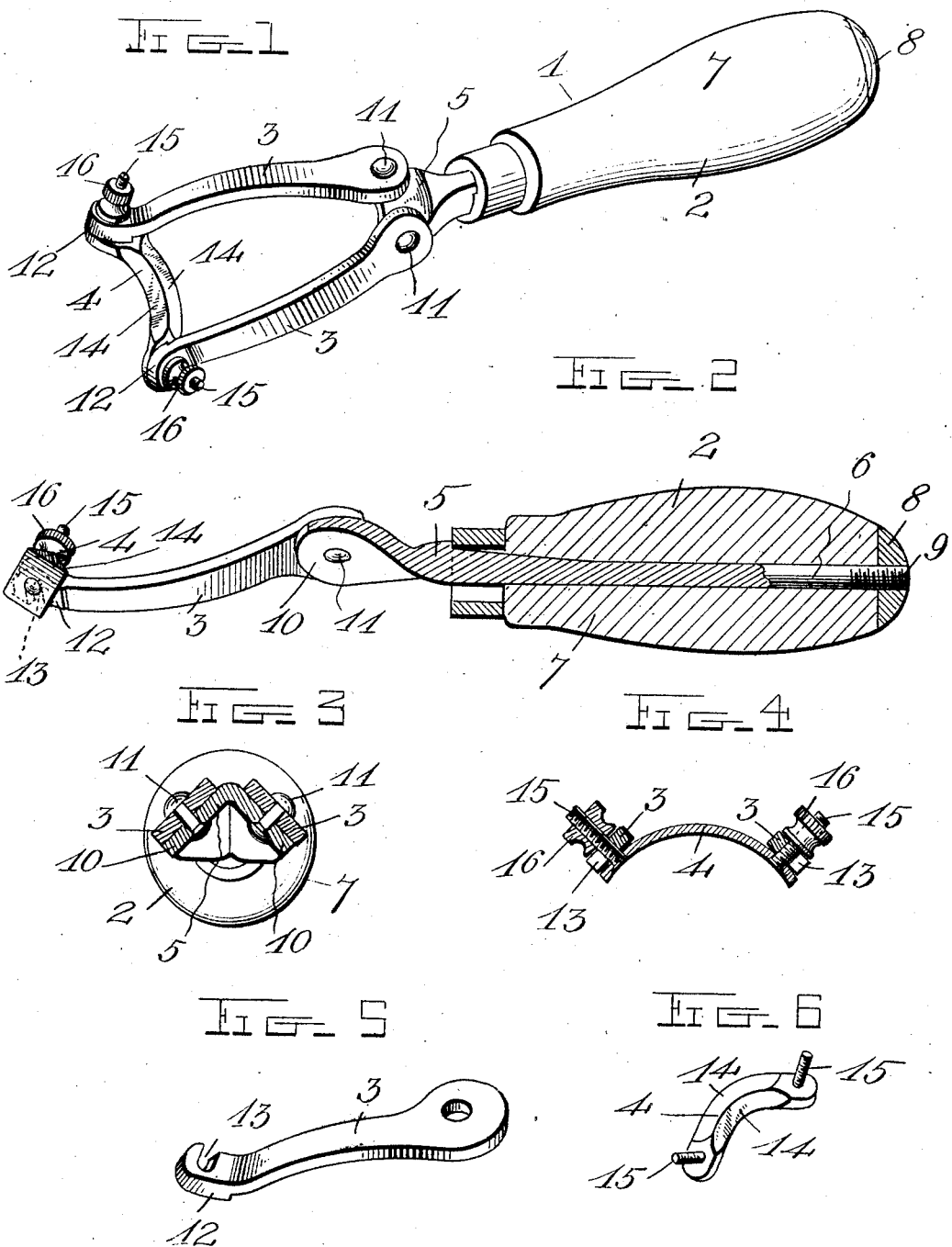

CHARLES W. JUSTUS, OF LIMA, OHIO.

WOODWORKING-TOOL.

No. 832,736.   Specification of Letters Patent.   Patented Oct. 9, 1906.

Application filed November 6, 1905. Serial No. 286,113.

*To all whom it may concern:*

Be it known that I, CHARLES W. JUSTUS, a citizen of the United States, residing at Lima, in the county of Allen and State of Ohio, have invented certain new and useful Improvements in Woodworking-Tools; and I do declare the following to be a full, clear, and exact description of the invention, such as will enable others skilled in the art to which it appertains to make and use the same.

My invention relates to improvements in woodworking-tools; and it consists in the novel construction, combination, and arrangement of parts hereinafter described and claimed.

The object of the invention is to provide a simple, inexpensive, and efficient tool of this character which may be used by pattern-makers and others for rounding corners and for various other purposes.

Another object of the invention is to provide a combination-tool of this character in which cutters of various kinds and sizes may be mounted to adapt the tool to a variety of uses.

The above and other objects which will appear as the nature of the invention is better understood, are accomplished by the construction illustrated in the accompanying drawings, in which—

Figure 1 is a perspective view of my improved woodworking-tool. Fig. 2 is a longitudinal sectional view. Figs. 3 and 4 are transverse sectional views. Fig. 5 is a perspective view of one of the arms, and Fig. 6 is a similar view of a cutting-blade of different size from the one shown in Fig. 1.

Referring to the drawings by numeral, 1 denotes my improved woodworking-tool, which consists of a handle 2, a pair of adjustable arms 3, and a detachable cutter-blade 4. The handle 2, as shown, consists of a body or head 5, having at one end a reduced stem or shank 6, which extends centrally through a hand-grip 7, which is retained thereon by a cap-nut 8. The latter is screwed upon the threaded end 9 of the stem 6 and forms the end of the hand-grip, as clearly shown in Fig. 2 of the drawings.

The body or head 5 of the handle is angular in cross-section, as shown in Fig. 3, and upon each half-section 10 of it is pivotally mounted one of the arms 3. This mounting, as shown, is effected by passing rivets 11 through openings formed in the inner enlarged ends of the arms 3 and similar openings in the portions 10 of the head, as shown. Owing to this mounting of the arms 3, their outer ends may be adjusted toward and from each other by swinging them from their pivots 11, so as to receive between their outer ends blades 4 of different kinds and sizes. The arms 4 have a slight longitudinal curvature and their outer ends are bent slightly, as shown at 12, and formed with notches or recesses 13, as shown in Figs. 4 and 5 of the drawings.

In Figs. 1 and 6 of the drawings I have shown two cutting-blades which are similar in form, but of different sizes. Each of these blades is curved longitudinally, so that it forms approximately a quarter of a circle and has its outer or convex side beveled in opposite directions, as shown at 14, to form two cutting edges along the sides of the blade. At each of the ends of the cutter is formed or provided an outwardly-projecting stud 15, which is adapted to project through one of the recesses 13 in the arms 3 and has its outer end screw-threaded to receive a clamping-nut, a thumb-nut, or other clamping device 16, as shown in Fig. 4 the drawings. These cutters 4 may be made in any desired size and shape, so that they may be detachably secured to the adjustable arms 3, as shown, or in any other suitable manner; but only one of the two cutting edges is used at a time, that one being the innermost one, so that when the latter becomes dull the other edge may be used by reversing the position of the cutter, as will be readily understood.

The construction, use, and advantages of the tool will be readily understood from the foregoing description, taken in connection with the accompanying drawings. It will be seen that the tool, while especially adapted for pattern-makers for use in rounding corners and doing similar work, may be used in various ways and for various purposes by varying the character of the cutter 4. By making the tools 4 as shown, so that they are approximately a quarter of a circle in length and their outer or convex side is beveled, an edge or corner may be quickly rounded in a true arc of a given radius, there being no danger of the blade cutting unevenly, owing to the disposition of its ends at right angles to each other.

I claim—

1. A tool of the class described comprising a handle having a head at one end, a pair of arms having their inner ends pivotally connected to said head to adapt said arms to be moved angularly on intersecting planes, so that the outer ends of said arms may be moved toward and from each other, and a curved cutter having its ends detachably connected to the outer ends of said arms.

2. A tool of the character described comprising a handle, a pair of arms pivoted thereon, and formed at their outer ends with recesses, a longitudinally-curved cutter-blade, screw-studs upon the ends of said blade adapted to project through the recesses in said arms, and clamping-nuts upon the ends of said screw-studs.

3. A tool of the character described comprising a head having angularly-disposed portions at one end and a reduced screw-threaded stem at its opposite end, a hand-grip upon said stem, a cap-nut upon the threaded end of said stud adapted to retain said hand-grip thereon, longitudinally-curved arms pivotally mounted upon the angularly-disposed portions of said head, the outer ends of said arms being bent and formed with recesses, a cutter curved longitudinally and having its outer or convex face beveled in opposite directions to form two cutting edges, screw-studs upon the ends of said cutter adapted to project through the recesses in said arms, and clamping-nuts upon the outer ends of said studs, substantially as described.

In testimony whereof I have hereunto set my hand in presence of two subscribing witnesses.

CHARLES W. JUSTUS.

Witnesses:
W. F. DAVIS,
E. G. DEMPSTER.